United States Patent
Kim

(10) Patent No.: US 9,685,899 B2
(45) Date of Patent: Jun. 20, 2017

(54) INVERTER FOR SUPPLYING LOAD-ADAPTIVE BOOST VOLTAGE

(71) Applicant: LSIS CO., LTD., Anyang-si, Gyeonggi-do (KR)

(72) Inventor: Hyojin Kim, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 15/003,667

(22) Filed: Jan. 21, 2016

(65) Prior Publication Data
US 2016/0268946 A1    Sep. 15, 2016

(30) Foreign Application Priority Data
Mar. 10, 2015   (KR) .......................... 10-2015-0033015

(51) Int. Cl.
H02P 21/34    (2016.01)
H02P 27/04    (2016.01)

(52) U.S. Cl.
CPC ............ *H02P 27/047* (2013.01); *H02P 21/34* (2016.02)

(58) Field of Classification Search
USPC .................................................. 318/807–812
See application file for complete search history.

(56) References Cited

U.S. PATENT DOCUMENTS

| | | | |
|---|---|---|---|
| 4,859,924 A | 8/1989 | Chonan | |
| 6,741,063 B2* | 5/2004 | Sakai et al. | H02P 21/34 318/798 |
| 2003/0020432 A1 | 1/2003 | Sakai et al. | |

FOREIGN PATENT DOCUMENTS

| | | |
|---|---|---|
| EP | 0335599 | 10/1989 |
| JP | H11103597 | 4/1999 |
| JP | 2001171919 | 6/2001 |
| JP | 2003037999 | 2/2003 |
| JP | 2013017351 | 1/2013 |
| KR | 1019970063893 | 9/1997 |

OTHER PUBLICATIONS

European Patent Office Application Serial No. 15203063.1, Search Report dated Aug. 4, 2016, 7 pages.
Korean Intellectual Property Office Application No. 10-2015-0033015, Office Action dated May 3, 2016, 4 pages.
Korean Intellectual Property Office Application No. 10-2015-0033015, Office Action dated Nov. 22, 2016, 4 pages.
Japan Patent Office Application No. 2016-017823, Office Action dated Jan. 17, 2017, 2 pages.

* cited by examiner

*Primary Examiner* — Bentsu Ro
(74) *Attorney, Agent, or Firm* — Lee, Hong, Degerman, Kang & Waimey

(57) ABSTRACT

An inverter which supplies a load-adaptive boost voltage and drives an induction motor includes a reference voltage determining unit configured to determine a reference voltage according to a reference frequency on the basis of a predetermined a relationship between a voltage and a frequency, an inverter unit configured to drive the induction motor according to the reference voltage, and an automatic torque boost voltage calculation unit configured to determine an automatic torque boost voltage value according to a magnitude of an output current from the inverter to the induction motor, wherein the reference voltage determining unit adds a preset manual boost voltage value and an automatic torque boost voltage value to the reference voltage and outputs the resultant voltage value as a final reference voltage.

7 Claims, 5 Drawing Sheets

INVERTER FOR SUPPLYING LOAD-ADAPTIVE BOOST VOLTAGE

CROSS-REFERENCE TO RELATED APPLICATION

Pursuant to 35 U.S.C. §119(a), this application claims the benefit of earlier filing date and right of priority to Korean Patent Application No. 10-2015-0033015, filed on Mar. 10, 2015, the contents of which are hereby incorporated by reference herein in its entirety.

BACKGROUND OF THE DISCLOSURE

1. Field of the Disclosure

The present disclosure relates to an inverter for supplying a load-adaptive boost voltage, and particularly, to an inverter capable of automatically adjusting an output voltage when an inverter is driven according to an amount of load and a load state to prevent failure and an accident that may occur due to an overcurrent at an initial stage of driving.

2. Background of the Disclosure

An inverter is a unit for switching received direct current (DC) power into alternating current (AC) power by a switching element and supplying the AC power to an induction motor to drive the induction motor.

The inverter generates a pulse width modulation (PWM) signal to control a switching element by the PWM signal to generate AC power, and vary a voltage and a frequency of AC power by controlling a pulse width of the PWM signal, thereby freely converting torque and a rotation speed of the induction motor.

Meanwhile, the induction motor is a motor used in various fields from fans and pumps to hoist loads such as cranes and elevators.

FIG. 1 is a schematic view of a general inverter system.

An inverter 2 receives power from a 3-phase power source 1 and converts the received power into a predetermined voltage and frequency to drive an induction motor 3.

The inverter 2 may be a 2-level inverter or a multi-level inverter of 3 levels or greater.

In driving an elevator load using an inverter, in a case in which the inverter is controlled according to an open loop control method, an output voltage is insufficient at an initial stage of driving, so an overcurrent may flow to cause the inverter to have a fault, or an elevator may instantaneously slide to cause people in an elevator to feel insecure.

In order to present such a problem, a manual boost method has been proposed.

The manual boost method is a method of operation by providing a value set by a user as a boost value. As illustrated in FIG. 2, a boost voltage amount may be set to be in inverse proportion such that a large amount is boosted in a low speed region and a small amount is boosted in a high speed region.

However, according to the manual boost method, torque may be insufficient in a low speed region or torque excessive more than necessary may be applied according to an amount of user setting. Also, according to the manual boost method, since a boost voltage amount is applied regardless of a load amount, a case in which an output voltage is insufficient or an output voltage is excessive occurs according to a load amount.

SUMMARY OF THE DISCLOSURE

Therefore, an aspect of the detailed description is to provide an inverter for supplying a load-adaptive boost voltage.

Another aspect of the detailed description is to automatically adjust an output voltage amount when an inverter is initially driven according to a load state to thereby prevent a fault or an accident that may occur due to an overcurrent at the initial stage of driving.

Another aspect of the detailed description is to reduce a feeling of insecurity of elevator passengers by preventing an event in which an elevator car slides, or the like, at an initial stage of driving when applied to an elevator load.

Another aspect of the detailed description is to automatically adjust an output voltage amount when an inverter is driven according to a load amount, and lower a load distribution ration of an automatic output voltage boost controller.

To achieve these and other advantages and in accordance with the purpose of this specification, as embodied and broadly described herein, an inverter which supplies a load-adaptive boost voltage and drives an induction motor may include: a reference voltage determining unit configured to determine a reference voltage according to a reference frequency on the basis of a predetermined a relationship between a voltage and a frequency; an inverter unit configured to drive the induction motor according to the reference voltage; and an automatic torque boost voltage calculation unit configured to determine an automatic torque boost voltage value according to a magnitude of an output current from the inverter to the induction motor, wherein the reference voltage determining unit adds a preset manual boost voltage value and an automatic torque boost voltage value to the reference voltage and outputs the resultant voltage value as a final reference voltage.

In an embodiment, the inverter may further include: a stationary reference frame conversion unit configured to convert an output voltage from the reference voltage determining unit into a voltage of a stationary reference frame and provide the converted voltage of stationary reference frame to the inverter unit.

In an embodiment, the inverter may further include: a current detection unit configured to detect a magnitude of a current output from the inverter to the induction motor.

In an embodiment, the automatic torque boost voltage value (Vboost_auto) may be calculated by Equation 1 below.

$$V\text{boost\_auto} = V p\_rated \times G\text{boost} \times |io|/|i\text{rated\_motor}| \quad \text{[Equation 1]}$$

Here, Vp_rated is a phase voltage value based on a motor rated sip, Gboost is a boost voltage gain, |io| is a magnitude of an output current, and |irated_motor| is a motor rated output current.

In an embodiment, the inverter may further include: a load state detection unit configured to determine whether the induction motor is in a retrogressive mode or a regenerative mode.

In an embodiment, when the induction motor is in the retrogressive mode, the boost voltage gain may be set to a retrogressive boost voltage gain (G_boost_motor).

In an embodiment, when the induction motor is in the regenerative mode, the boost voltage gain may be set to a regenerative boost voltage gain (G_boost_gen).

According to the embodiment of the present disclosure, an output voltage amount may be automatically adjusted when an inverter driven according to a load amount.

Thus, in the present disclosure, a fault or an accident that may occur due to an overcurrent at an initial stage of driving of the inverter, and a trip of the inverter or a stall of the induction motor may be prevented.

Also, when the present disclosure is applied to an elevator load, or the like, an event in which the elevator car slides at an initial driving, thereby lowering uneasy feeling of elevator passengers.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
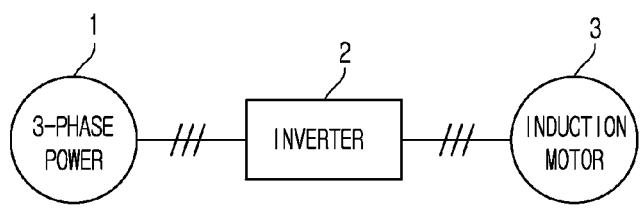
FIG. 1 is a schematic view of a general inverter system.
Figure 2:
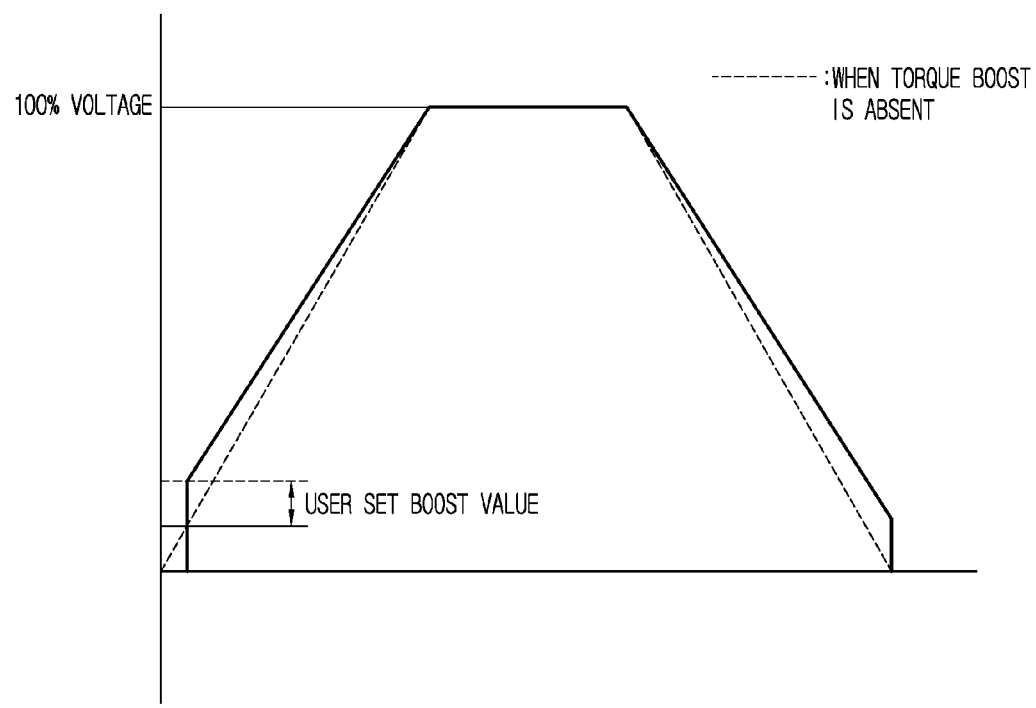
FIG. 2 is a view illustrating a method for controlling a manual boost of an inverter.

The present disclosure may be modified variably and may have various embodiments, particular examples of which will be illustrated in drawings and described in detail. However, it is to be understood that the present disclosure is not limited to a specific disclosed form, but includes all modifications, equivalents, and substitutions without departing from the scope and spirit of the present disclosure.

Hereinafter, exemplary embodiments of the present inventive concept will be described in detail with reference to the accompanying drawings. In the drawings, the same reference numerals will be used throughout to designate the same or like elements.

Figure 4:
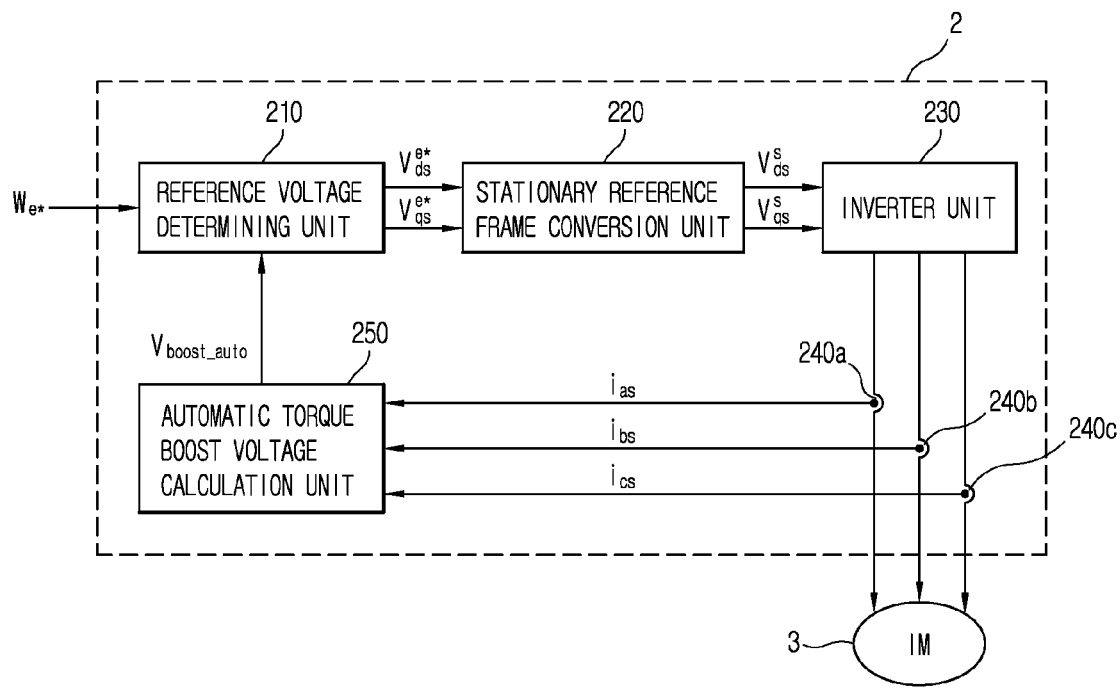
FIG. 4 is a view illustrating a configuration of an inverter for supplying a load-adaptive boost voltage according to an embodiment of the present disclosure.

FIG. 4 is a view illustrating a configuration of an inverter for supplying a load-adaptive boost voltage according to an embodiment of the present disclosure. As illustrated in FIG. 4, an inverter 2 according to an embodiment of the present disclosure may include a reference voltage determining unit 210, a stationary reference frame conversion unit 220, an inverter unit 230, and an automatic torque boost voltage calculation unit 250.

Figure 3:
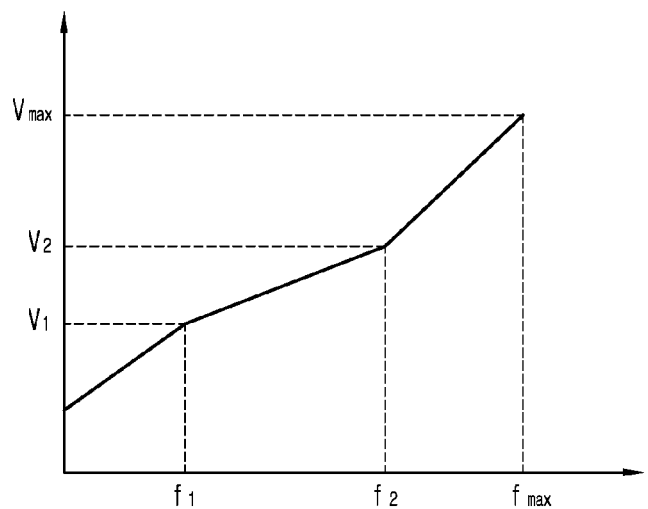
FIG. 3 is a view illustrating an example of an output voltage according to a frequency for operating a general inverter.

The reference voltage determining unit 210 determines a reference voltage of the inverter 2 on a synchronization coordinate system from a reference frequency. Here, as illustrated in FIG. 3, the reference voltage determining unit 210 determines a reference voltage according to a predetermined voltage-frequency relationship, and in a predetermined case (for example, when a start torque is greatly required, in a case in which a load variation is large, or the like.), the reference voltage determining unit 210 may determine a reference voltage according to an operation of the automatic torque boost voltage calculation unit 250.

The stationary reference frame conversion unit 220 may convert an output from the reference voltage determining unit into an output voltage on a stationary reference frame. The inverter 2 is a voltage type inverter and may apply a 3-phase voltage to the induction motor 3 according to a reference voltage of the stationary reference frame.

The inverter unit 230 drives the induction motor 3 according to a reference voltage. The inverter unit 230 may further include a pulse width modulation (PWM) unit (not shown), and the PWM unit may include a control unit calculating a PWM signal and a switching unit switching an output voltage to be output to the induction motor 3 by using the PWM signal calculated by the control unit. Also, the inverter unit 230 may further include a switch mode power supply (not shown). When a voltage is equal to or higher than a predetermined driving voltage, the SMPS may start to be operated to control a flow of electric power by using a switching process of a semiconductor device to generate power used for driving, protecting, or/and sensing the inverter.

Meanwhile, the inverter 2 may further include current detection units 240a, 240b, and 240c. The current detection units 240a, 240b, and 240c detect a phase current between the induction motor 3 and the inverter 2, and a current detected by the current detection units 240a, 240b, and 240c is provided to the automatic torque boost voltage calculation unit 250.

The automatic torque boost voltage calculation unit 250 determines an automatic torque boost voltage value Vboost_auto from inverter output currents ias, ibs, and ics.

Hereinafter, an operation of the automatic torque boost voltage calculation unit 250 will be mainly described.

The automatic torque boost voltage calculation unit 250 determines an automatic torque boost voltage value by using a magnitude of an inverter output current. In detail, the automatic torque boost voltage calculation unit 250 determines the automatic torque boost voltage by using Equation 1 below.

$$Vboost\_auto = Vp\_rated \times Gboost \times |io|/|irated\_motor| \quad \text{[Equation 1]}$$

$$|io|=0<Gboost\leq 1$$

Here, Vboost_auto is an automatic torque boost voltage value, Vp_rated is a phase voltage value based on a motor rated slip, Gboost is a boost voltage gain, |io| is a magnitude of an output current, and |irated_motor| is a motor rated output current. As the Gboost, a retrogressive boost voltage gain (Gboost_motor) and a regenerative boost voltage gain (Gboost_gen) may be selectively applied according to an operational state of a load.

In this connection, the inverter 2 according to an embodiment of the present disclosure may further include a load state detection unit. The load state detection unit (not shown) may be applied to a load that may have a retrogressive (motoring) state and a regenerative (generating) state according to a load, like an elevator load, to detect whether the load is in a retrogressive state or in a regenerative state. According to a load state detected by the load state detection unit, when the load is in the retrogressive state, the retrogressive boost voltage gain (Gboost_motor) in Equation 1 is applied, and when the load is in the regenerative state, the regenerative boost voltage gain (Gboost_gen) in Equation 1 is applied, and here, an output voltage and a control method may be varied according to load states.

Figure 5:
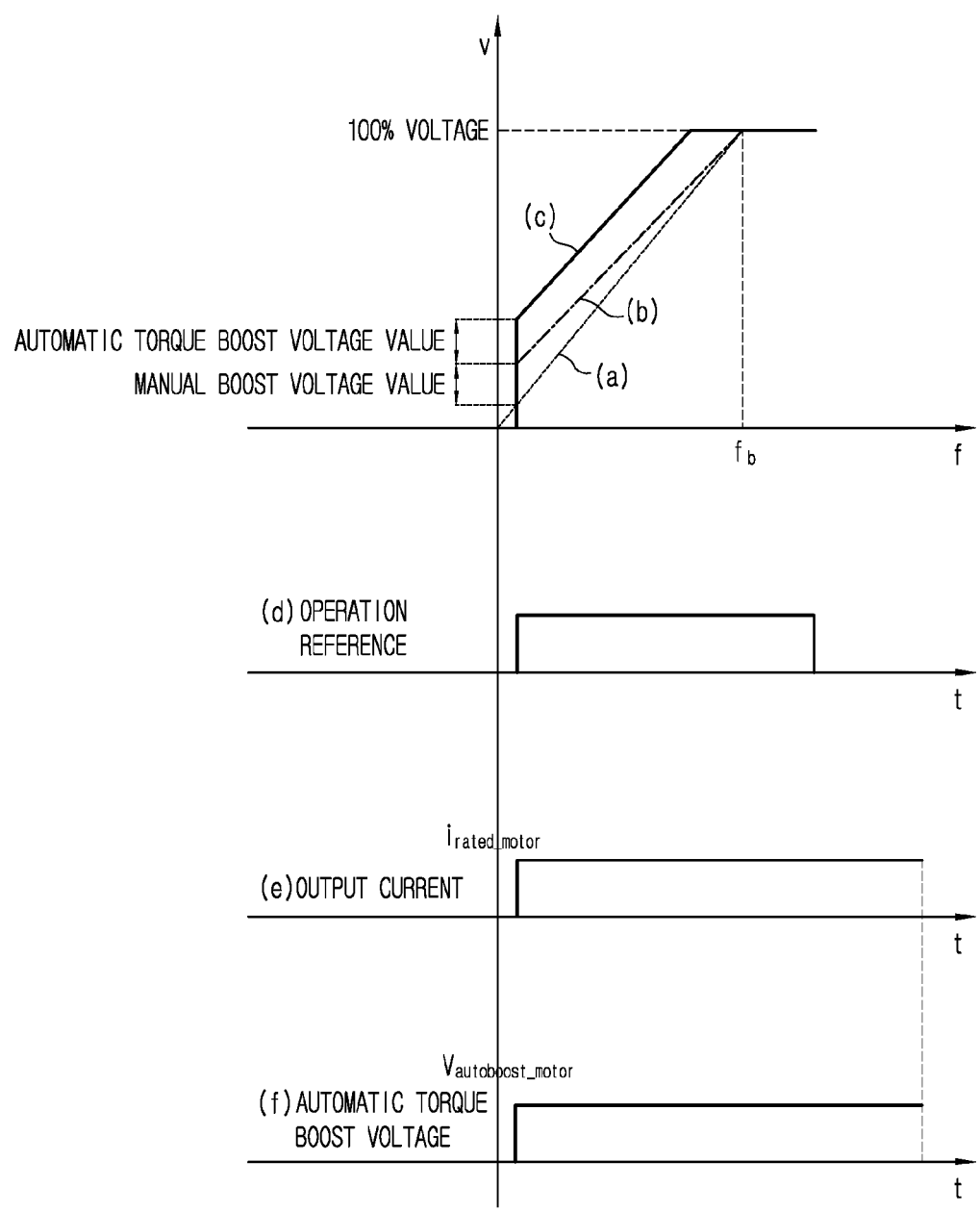
FIG. 5 is a graph of an output voltage of an inverter according to frequency in a load retrogressive state.

FIG. 5 is a graph of an output voltage of an inverter according to frequency in a load retrogressive state (motoring region). Referring to FIG. 5, there are illustrated voltage-frequency relationships in a case (a) in which there is no load and a boost amount has not been set, in a case (b) in which there is no load and a manual boost voltage has been set, and in a case (c) in which a load as much as a motor rated current according to an embodiment of the present disclosure is applied and an automatic torque boost voltage value has been applied. Also, an inverter operation reference signal (d), an output current (e), and an automatic torque boost voltage (f) graphs are illustrated together.

In the case (a) in which there is no load and a boost amount has not been set, it can be seen that a voltage is increased linearly as a frequency is increased. Meanwhile, in the case (b) in which a manual boost voltage has been set, a manual boost voltage value set by a user is added to an output voltage value based on a predetermined voltage ratio at a low speed, and as a frequency is increased, the added manual boost voltage value is reduced, and when the frequency reaches a base frequency (fb), the manual boost voltage value set by the user is added to the output voltage value based on a predetermined voltage ratio at a low speed, and the manual boost voltage value is reduced as the frequency is increased, and when the frequency reaches the base frequency (fb), the added boost voltage value is 0.

Meanwhile, for example, in the case (c) in which a load as much as the motor rated current is applied and the automatic torque boost voltage value is applied, an automatic torque boost amount automatically calculated according to a load is added to the output voltage value. In the embodiment of FIG. 5, an example in which the automatic torque boost voltage value is added to the output voltage value in addition to the manual boost voltage value set by the user and output is illustrated, but here, only the automatic torque boost voltage value may be added to the output voltage value according to a user setting.

Figure 6:
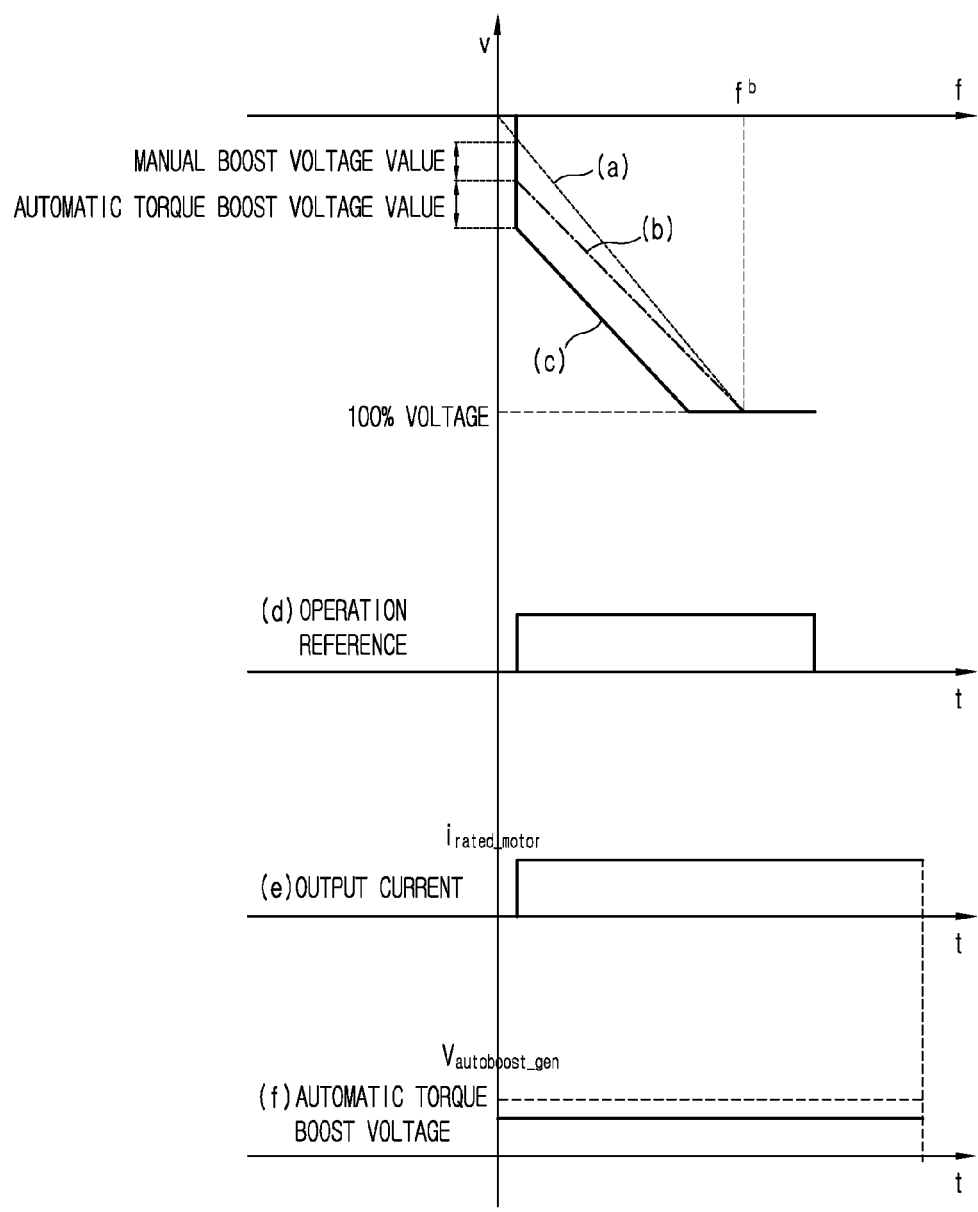
FIG. 6 is a graph of an output voltage of an inverter according to frequency in a load regenerative state.

FIG. 6 is a graph of an output voltage of an inverter according to frequency in a load regenerative state (generating region). Referring to FIG. 6, There are illustrated voltage-frequency relationships in a case (a) in which there is no load and a boost amount has not been set, in a case (b) in which there is no load and a manual boost voltage has been set, and in a case (c) in which a load as much as a motor rated current according to an embodiment of the present disclosure is applied and an automatic torque boost voltage value has been applied.

The operation in the generating region is similar to the operation in the motoring region, except that a regenerative boost voltage gain (Gboost_gen) is applied as a boost voltage gain.

Figure 7:
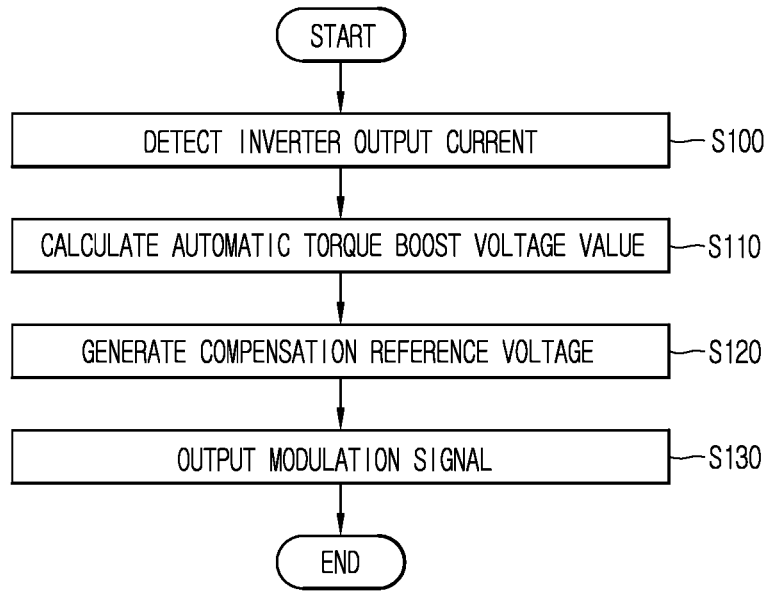
FIG. 7 is a flow chart illustrating a method for controlling an inverter according to an embodiment of the present disclosure.

Hereinafter, a method for controlling an inverter according to an exemplary embodiment of the present disclosure will be described. As illustrated in FIG. 7, first, an output current from the inverter to the induction motor is detected in step S100. After the inverter output current is detected, an automatic torque boost voltage value is calculated according to a magnitude of an output current in step S110. After the automatic torque boost voltage value is calculated, the calculated automatic torque boost voltage value is added to a reference voltage of the inverter to generate a compensation reference voltage in step S120. Here, a final command voltage may be generated by adding a boost voltage to a manual boost voltage previously set by the user. When the reference voltage is generated, the generated reference voltage is PWM-modulated and output to the induction motor in step S130.

Here, the automatic torque boost voltage value may be calculated according to a magnitude of an output current by using Equation 1 below.

$$Vboost\_auto = Vp\_rated \times Gboost \times |io|/|irated\_motor|$$ [Equation 1]

Here, Vp_rated is a phase voltage value based on a motor rated slip, Gboost is a boost voltage gain, |io| is a magnitude of an output current, and |irated_motor| is a motor rated output current.

Meanwhile, the method for controlling an inverter according to an embodiment of the present disclosure may further include detecting whether the induction motor is in a retrogressive mode or a regenerative mode. When the induction motor is in the retrogressive mode, a boost voltage gain of Equation 1 may be set to a retrogressive boost voltage gain (G_boost_motor), and when the induction motor is in the regenerative mode, the boost voltage gain of Equation 1 may be set to a retrogressive boost voltage gain (G_boost_motor).

According to an embodiment of the present disclosure, since an output voltage is automatically adjusted when an inverter is driven according to a load amount and a load state, a fault or an accident that may occur due to an overcurrent at an initial stage of driving, and in addition, the present disclosure may be applied to an elevator load, or the like, to prevent an event such that an elevator car slides, or the like, to thereby lower an uneasy feeling of elevator passengers.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An inverter which supplies a load-adaptive boost voltage and drives an induction motor, the inverter comprising:
   a reference voltage determining unit configured to determine a reference voltage according to a reference frequency on the basis of a predetermined a relationship between a voltage and a frequency;
   an inverter unit configured to drive the induction motor according to the reference voltage; and
   an automatic torque boost voltage calculation unit configured to determine an automatic torque boost voltage value according to a magnitude of an output current from the inverter to the induction motor, wherein the reference voltage determining unit adds a preset manual boost voltage value and an automatic torque boost voltage value to the reference voltage and outputs the resultant voltage value as a final reference voltage.

2. The inverter of claim 1, further comprising:
a stationary reference frame conversion unit configured to convert an output voltage from the reference voltage determining unit into a voltage of a stationary reference frame and provide the converted voltage of stationary reference frame to the inverter unit.

3. The inverter of claim 1, further comprising:
a current detection unit configured to detect a magnitude of a current output from the inverter to the induction motor.

4. The inverter of claim 1, wherein the automatic torque boost voltage value (Vboost_auto) is calculated by Equation 1 below.

$$Vboost\_auto = Vp\_rated \times Gboost \times |io|/|irated\_motor| \quad [\text{Equation 1}]$$

where Vp_rated is a phase voltage value based on a motor rated sip, Gboost is a boost voltage gain, |io| is a magnitude of an output current, and |irated_motor| is a motor rated output current.

5. The inverter of claim 4, further comprising:
a load state detection unit configured to determine whether the induction motor is in a retrogressive mode or a regenerative mode.

6. The inverter of claim 5, wherein when the induction motor is in the retrogressive mode, the boost voltage gain is set to a retrogressive boost voltage gain (G_boost_motor).

7. The inverter of claim 5, wherein when the induction motor is in the regenerative mode, the boost voltage gain is set to a regenerative boost voltage gain (G_boost_gen).

* * * * *